(12) United States Patent
Utaka et al.

(10) Patent No.: US 7,394,965 B2
(45) Date of Patent: Jul. 1, 2008

(54) PHOTOSENSITIVE RESIN COMPOSITION FOR OPTICAL WAVEGUIDE FORMATION AND OPTICAL WAVEGUIDE

(75) Inventors: Tomohiro Utaka, Chuo-ku (JP); Hideaki Takase, Chuo-ku (JP); Yuuichi Eriyama, Chuo-ku (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 10/593,815

(22) PCT Filed: Feb. 23, 2005

(86) PCT No.: PCT/JP2005/003418

§ 371 (c)(1),
(2), (4) Date: Mar. 23, 2007

(87) PCT Pub. No.: WO2005/091027

PCT Pub. Date: Sep. 29, 2005

(65) Prior Publication Data

US 2007/0223868 A1 Sep. 27, 2007

(30) Foreign Application Priority Data

Mar. 23, 2004 (JP) ............................. 2004-084283

(51) Int. Cl.
*G02B 6/00* (2006.01)
(52) U.S. Cl. ............................ 385/141; 528/87; 522/170
(58) Field of Classification Search ........................ None
See application file for complete search history.

(56) References Cited

FOREIGN PATENT DOCUMENTS

| | | |
|---|---|---|
| JP | 8-271746 | 10/1996 |
| JP | 9-243870 | 9/1997 |
| JP | 2000-356720 | 12/2000 |
| JP | 2003-147045 | 5/2003 |
| JP | 2003147045 | * 5/2003 |
| JP | 2003-177260 | 6/2003 |
| JP | 2003-195078 | 7/2003 |
| JP | 2003-202438 | 7/2003 |

* cited by examiner

*Primary Examiner*—M. R. Connelly-Cushwa
*Assistant Examiner*—Chad H Smith
(74) *Attorney, Agent, or Firm*—Oblon, Spivak, McClelland, Maier & Neustadt, P.C.

(57) ABSTRACT

A radiation-sensitive resin composition for forming optical waveguides, which comprises (A) a novolac type epoxy resin and (B) a photo-acid generator. The composition is used as materials for a core portion 5 of an optical waveguide 1, and the like. In the composition, component (A) is represented by the following general formula (1).

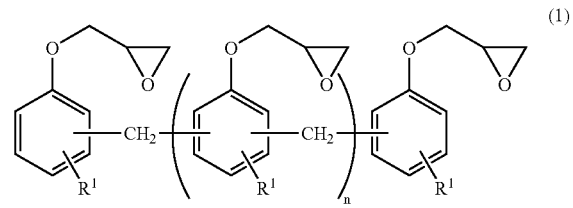

(In the formula, $R^1$ is a hydrogen atom, an alkyl group having 1 to 12 carbon atoms, or an aralkyl group; and n is an integer from 0 to 10.) The composition is excellent in patterning properties and the like in curing process, and is also excellent in heat resistance, transmission characteristics, and long-term reliability after the optical waveguide has been formed.

8 Claims, 1 Drawing Sheet

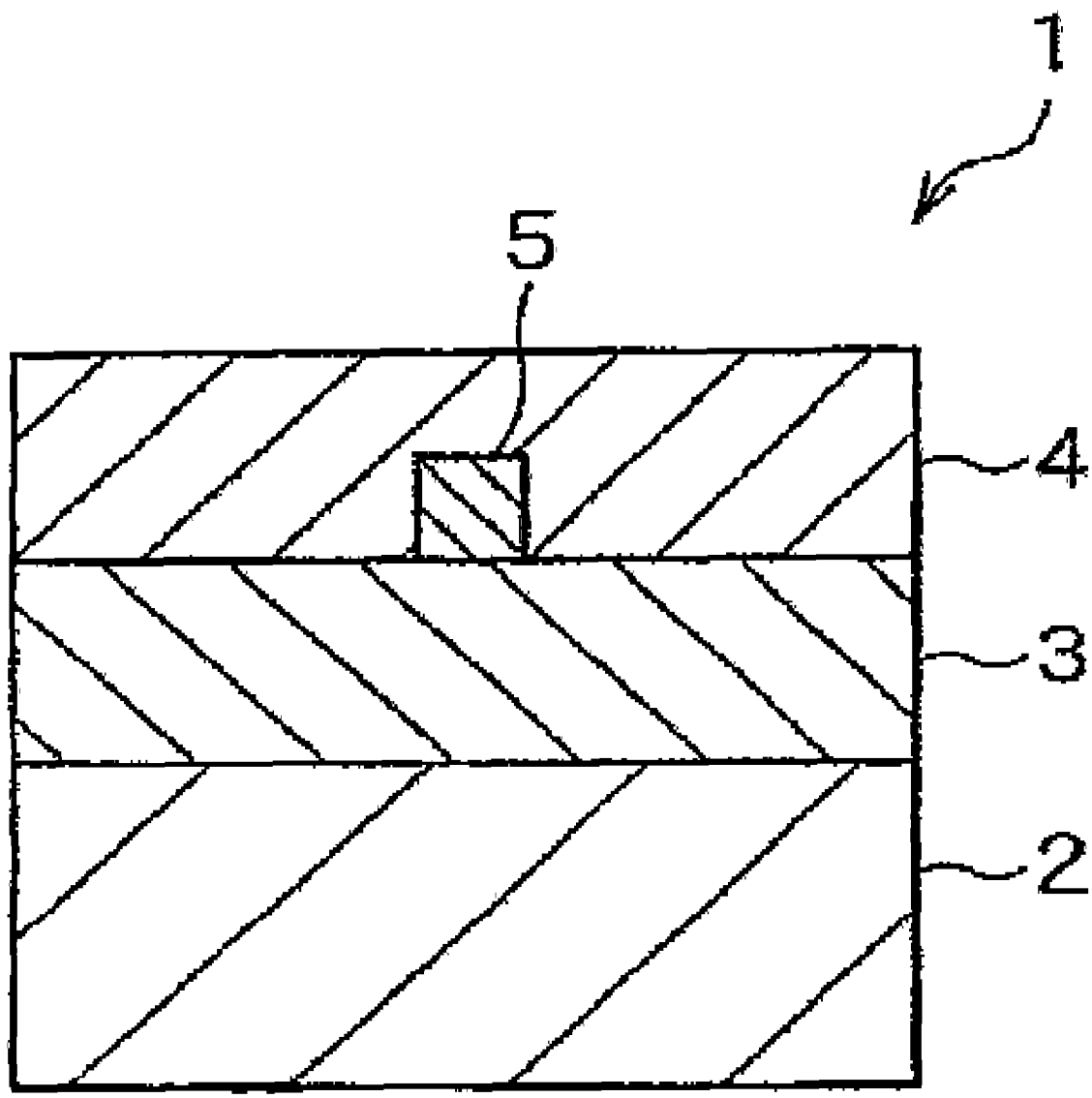

PHOTOSENSITIVE RESIN COMPOSITION FOR OPTICAL WAVEGUIDE FORMATION AND OPTICAL WAVEGUIDE

TECHNICAL FIELD

The present invention relates to a radiation-sensitive resin composition for forming optical waveguides that are components of optical circuits used in optical communication fields or optical information processing fields, and also relates to an optical waveguide manufactured by using the composition, which is mainly for multi-mode.

BACKGROUND ART

As we enter the multimedia age, due to demands to increase the capacity and speed of data processing in optical communication systems and computers, transmission systems using optical transmission mediums have come to be used in public telecommunication networks, LANs (i.e. local area networks), FAs (i.e. factory automations), interconnects between computers, household wirings, and the like.

Among components constituting the transmission system, an optical waveguide is a basic constituent of optical devices for realizing optical computers or high-capacity communications such as movies, moving images, and the like; optoelectronic integrated circuits (OEIC); optical integrated circuits (Optical IC); and the like. Since there is a very large market for the optical waveguide, diligent study on the optical waveguide has been conducted, and especially, a product with higher performance and lower cost is needed.

Conventionally, silica optical waveguides and polymer optical waveguides have been known as the optical waveguide.

Of these, silica optical waveguides have the advantage of having low transmission loss, but many steps such as a vitrification step at high temperature (at least 120 degree C.) and an etching process are required, resulting in a difficulty in improving manufacturing efficiency.

On the other hand, polymer optical waveguides seem to be promising in the future since the polymer optical waveguides have the advantages of the easiness of processing and the freedom of choice in selecting materials, and the like. Therefore, in addition to commodity materials such as poly(methyl methacrylate) and the like, there have been developed various materials having more excellent properties.

For example, there has been recently proposed a technique in which a radiation-sensitive composition containing an epoxy resin is used to manufacture an optical waveguide which has excellent aligning accuracy and the like.

Specifically, there has been proposed an optical waveguide comprising at least a core portion and a clad layer which covers the core portion and has a lower refractive index than the core portion, in which the core portion is a photo-cured product or a heat-cured product of a mixture of a monomer or a oligomer having an epoxy ring (e.g. an epoxy UV monomer having a specific chemical structure) and a polymerization initiator (see Japanese Laid-Open Patent Publication H8-271746).

This optical waveguide is especially for single-mode, and can be optically coupled with other optical components with easiness, low loss and an aligning accuracy of less than 10 micrometers.

Also, there has been proposed a material for forming an optical waveguide capable of transmitting an optical signal therein, which comprises the first compound having an oxetane ring, the second compound for initiating polymerization by chain reaction (specifically, a cationic polymerization initiator), and the third compound having an oxirane ring (for example, a glycidyl epoxy resin such as bisphenol A epoxy resin and the like), and which can be cured by an energy beam (see Japanese Laid-Open Patent Publication 2000-356720).

By using the above material for an optical waveguide, the chain reaction can proceed rapidly, and it is possible to obtain a highly cross-linked polymer having excellent solvent resistance.

Generally, epoxy resin is also used as a sealant for an optical module.

For example, there has been proposed a method for manufacturing an optical module, which comprises: a step in which a light path between several optical components such as a light emitting element etc, mounted on a base substrate is precoated by an light-transmitting resin; a step in which the light path is covered with a photocurable resin which comprises an epoxy resin having an epoxy equivalent of from 160 to 250 g/eq selected from among novolac type epoxy resins etc, an inorganic filler, and a photo-acid generator as essential components; and the like (see Japanese Laid-Open Patent Publication H9-243870).

DISCLOSURE OF THE INVENTION

As described above, the polymer optical waveguide manufactured using a specific epoxy resin and the like has been proposed.

However, as the polymer optical waveguide becomes to exhibit higher performance, the polymer optical waveguide has been needed to be particularly excellent in heat resistance, transmission characteristics, long-term reliability, and the like as well as in patterning properties and the like.

It is thus an object of the present invention to provide a polymer optical waveguide which is excellent in patterning properties, heat resistance, transmission characteristics, and long-term reliability, and to provide a radiation-sensitive resin composition for manufacturing the optical waveguide.

As a result of diligent study aimed at solving the above problem, the inventors perfected the present invention upon discovering that the intended optical waveguide can be manufactured by using a specific epoxy resin.

More specifically, the radiation-sensitive resin composition for forming optical waveguides of the present invention is characterized in that the radiation-sensitive resin composition comprises (A) a novolac type epoxy resin and (B) a photo-acid generator.

Component (A) described above has an epoxy equivalent preferably of 50 to 1,000 g/eq.

The resin composition has a refractive index ($n_D^{25}$) preferably of 1.55 or more when cured.

The resin composition has a glass-transition temperature (Tg) preferably of 100 degree C. or higher when cured.

Preferable examples of component (A) include a novolac type epoxy resin represented by the following general formula (1), (2), or (3).

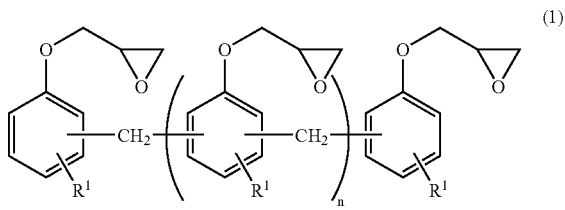

(1)

(In the formula, $R^1$ is a hydrogen atom, an alkyl group having 1 to 12 carbon atoms, or an aralkyl group; and n is an integer from 0 to 10.)

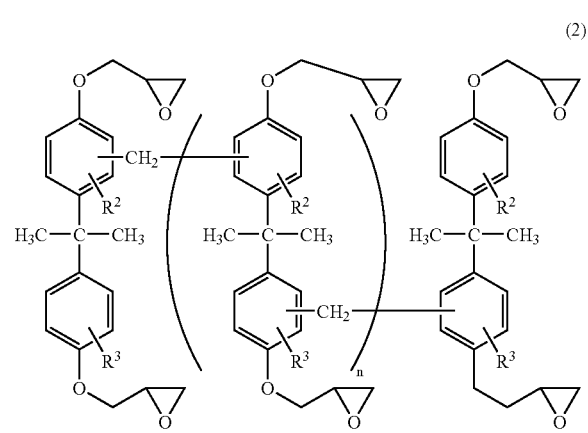

(2)

(In the formula, $R^2$ and $R^3$ are each independently a hydrogen atom, an alkyl group having 1 to 12 carbon atoms, or an aralkyl group; and n is an integer from 0 to 10.)

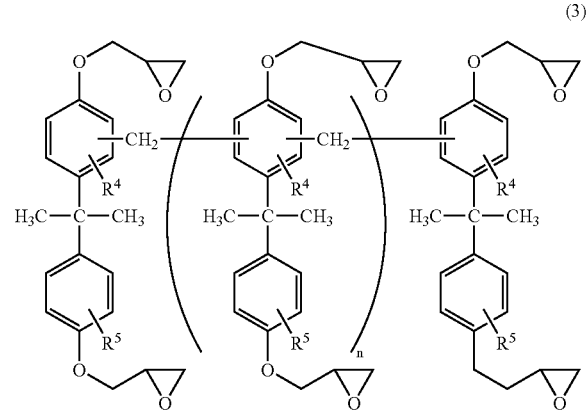

(3)

(In the formula, $R^4$ and $R^5$ are each independently a hydrogen atom, an alkyl group having 1 to 12 carbon atoms, or an aralkyl group; and n is an integer from 0 to 10.)

The optical waveguide of the present invention comprises a lower clad layer, a core portion, and an upper clad layer, wherein at least one selected form the lower clad layer, the core portion, and the upper clad layer is a cured product of the resin composition mentioned above.

The resin composition of the present invention is excellent in patterning properties, coating properties, and curing properties when the resin composition is being cured. Also, the resin composition has a high refractive index suitable for use as an optical waveguide, and is excellent in heat resistance, transmission characteristics (i.e. low waveguide loss), and long-term reliability after an optical waveguide has been formed using the resin composition. Therefore, the resin composition of the present invention can be advantageously used as a material for forming optical waveguides.

Moreover, it is possible to apply the resin composition of the present invention using spin coating method without using a solvent, and to pattern the resin composition via a photo-mask. Also, it is not necessary for the resin composition to be post-baked after exposure, so that manufacturing efficiency can be improved.

BRIEF DESCRIPTION OF THE DRAWINGS

FIG. 1 is a sectional view illustrating an example of an optical waveguide manufactured by using a resin composition for forming optical waveguides of the present invention.

BEST MODE FOR CARRYING OUT THE INVENTION

The present invention will now be described in detail.

The radiation-sensitive resin composition for forming optical waveguides of the present invention comprises (A) a novolac type epoxy resin and (B) a photo-acid generator. Here, the number of a repeating unit in component (A) is preferably 2 to 12.

A preferable example of the radiation-sensitive resin composition for forming optical waveguides of the present invention comprises the following components (A) and (B) as constituents. Component (C) described below can be optionally included.

Here, the term "resin composition" has a concept including both of a state before being cured and a state after being cured.

[Component (A)]

Component (A), which constitutes the resin composition of the present invention, is preferably a novolac type epoxy resin represented by the following general formula (1), (2), or (3).

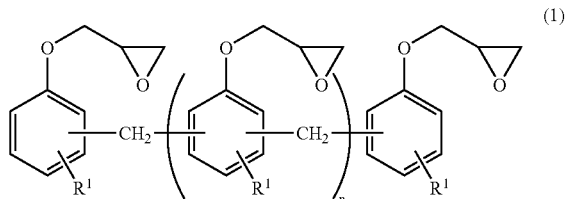

(1)

(In the formula, $R^1$ is a hydrogen atom, an alkyl group having 1 to 12 carbon atoms, or an aralkyl group; and n is an integer from 0 to 10.)

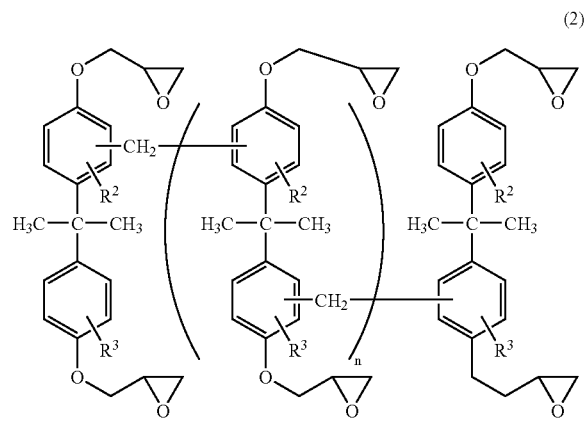

(2)

(In the formula, $R^2$ and $R^3$ are each independently a hydrogen atom, an alkyl group having 1 to 12 carbon atoms, or an aralkyl group; and n is an integer from 0 to 10.)

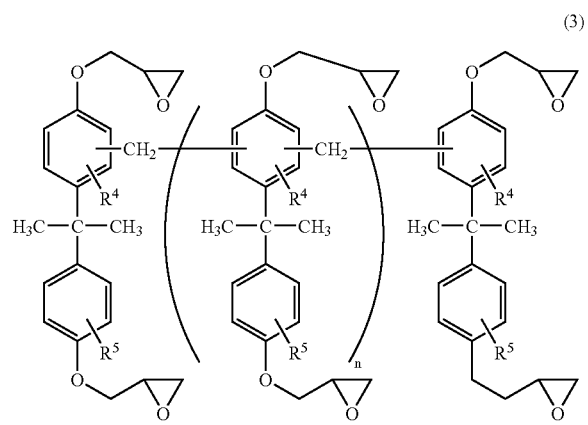

(3)

(In the formula, $R^4$ and $R^5$ are each independently a hydrogen atom, an alkyl group having 1 to 12 carbon atoms, or an aralkyl group; and n is an integer from 0 to 10.)

$R^1$ to $R^5$ in general formulae (1) to (3) are each independently a hydrogen atom, an alkyl group having 1 to 12 carbon atoms, or an aralkyl group, preferably a hydrogen atom, or an alkyl group having 1 to 8 carbon atoms, more preferably a hydrogen atom. When the carbon number exceeds 12, the waveguide may have a problem in heat resistance and the like due to decreased glass-transition temperature of a cured product.

The alkyl group having 1 to 12 carbon atoms and the aralkyl group may be linear, branched, or cyclic. Examples of the alkyl group and the aralkyl group include a methyl group, ethyl group, propyl group, butyl group, isobutyl group, pentyl group, hexyl group, cyclohexyl group, heptyl group, octyl group, —C(CH$_3$)$_2$—C$_6$H$_5$, —C(CH$_3$)$_2$—CH$_2$—C(CH$_3$)$_3$, —C$_{10}$H$_{20}$—CH$_3$, —C$_{11}$H$_{22}$—CH$_3$, and the like.

Here, the epoxy resin of general formula (1), in which $R^1$ is a hydrogen atom, is referred to as phenol novolac type epoxy resin. Also, the epoxy resin, in which $R^1$ is a methyl group, is referred to as cresol novolac type epoxy resin. The epoxy resins of general formulae (2) and (3) are referred to as bisphenol A novolac type epoxy resin.

"n" in general formulae (1) to (3) is in the range of 0 to 10, preferably in the range of 0 to 8. When n exceeds 10, there may be problems with handling and coating properties due to increased viscosity of the resin composition.

In the present invention, it is necessary to use an oligomer or a polymer in which the number of a repeating unit in the chemical structure of the compound is at least two (preferably from two to twelve) as shown in general formulae (1) to (3). In case that a compound in which the number of a repeating unit is one (i.e. an epoxy monomer) is used, increased curing shrinkage may cause a separation, which may cause a decrease in reliability, at a boundary between the waveguide and a substrate, or between layers constituting the waveguide when the waveguide is used in various environments.

The novolac type epoxy resins represented by general formula (1) are available as commercial compounds under the trade names of Epikote152, Epikote154 (manufactured by Japan Epoxy Resins Co., Ltd.); EPICLON N740, EPICLON N770 (manufactured by Dainippon Ink and Chemicals, Inc.); EPOTOHTO YDPN638 (manufactured by Tohto Kasei Co., Ltd.); DER431, DER438 (manufactured by The Dow Chemical Company); Araldite EPN1138 (manufactured by Ciba-Geigy) (all these are phenol novolac type epoxy resins); Epikote180 (manufactured by Japan Epoxy Resins Co., Ltd.); EPICLON N660, EPICLON N670 (manufactured by Dainippon Ink and Chemicals, Inc.); EPOTOHTO YDCN701, EPOTOHTO YDCN702 (manufactured by Tohto Kasei Co., Ltd.); Araldite ECN1273, Araldite ECN1280 (manufactured by Ciba-Geigy) (all these are cresol novolac type epoxy resins); and the like.

The novolac type epoxy resins represented by general formulae (2) and (3) are available as commercial compounds under the trade names of Epikote157S65, Epikote157S70 (manufactured by Japan Epoxy Resins Co., Ltd.); N865 (manufactured by Dainippon Ink and Chemicals, Inc.); and the like.

Component (A) has an epoxy equivalent preferably of 50 to 1,000 g/eq, more preferably of 100 to 500 g/eq, most preferably of 100 to 300 g/eq. When the value is less than 50 g/eq, curing shrinkage increases to have undesirable influence on waveguide characteristics. When the value exceeds 1,000 g/eq, there may be a problem in reliability due to insufficient heat resistance.

Here, the term "epoxy equivalent" means the mass of a resin having 1 g equivalent of an epoxy group. Epoxy equivalent can be calculated by "Determination of epoxy equivalent in epoxy resins" according to JIS K 7236.

The resin composition of the present invention includes component (A) in an amount preferably of 10 to 99.9 mass percent (i.e. weight percent), more preferably of 10 to 90 mass percent, most preferably of 15 to 80 mass percent. When the amount is less than 10 mass percent, it is sometimes difficult to obtain all of heat resistance, long-term reliability and the like, which are needed for the waveguide. When the amount exceeds 99.9 mass percent, the content of component (B) (i.e. a photo-acid generator) decreases, resulting in that the curing speed and the curing extent of the composition may decrease, and sufficient heat resistance may not be obtained.

[Component (B)]

Component (B), which constitutes the resin composition of the present invention, is a photo-acid generator.

The photo-acid generator is a photo-cationic polymerization initiator which releases a Lewis acid by being subjected to light.

An example of the photo-acid generator is an onium salt having a structure represented by the following general formula (4). This onium salt substantially exhibits an optical absorption in a wavelength range below 400 nm.

$$[R^6{}_a R^7{}_b R^8{}_c R^9{}_d Z]^{+m}[MX_{n+m}]^{-m} \quad (4)$$

(In the formula, the cation is an onium ion; Z is S, Se, Te, P, As, Sb, Bi, O, I, Br, Cl, or —N≡N; and $R^6$, $R^7$, $R^8$, and $R^9$ are the same or different organic groups. a, b, c, and d are each independently an integer from 0 to 3; and (a+b+c+d) is equal to the valence of Z. M is a metal or a metalloid constituting the center atom of the halogenated complex $[MX_{n+m}]$, such as B, P, As, Sb, Fe, Sn, Bi, Al, Ca, In, Ti, Zn, Sc, V, Cr, Mn, Co or the like. X is a halogen atom such as F, Cl, Br, or the like; m is a net electric charge of the halogenated complex ion; and n is the atomic valence of M.)

Examples of the onium ion in general formula (4) include a diaryliodonium such as diphenyliodonium, 4-methoxydiphenyliodonium, bis(4-methylphenyl)iodonium, bis(4-tert-butylphenyl)iodonium, bis(dodecylphenyl)iodonium, and the like; a triarylsulfonium such as triphenylsulfonium, diphenyl-4-thiophenoxyphenylsulfonium, and the like; bis[4-(diphenylsulfonio)-phenyl]sulfide, bis[4-(di(4-(2-hydroxyethyl)phenyl)sulfonio)-phenyl]sulfide, $\eta^5$-2,4-(cyclopentadienyl)[1,2,3,4,5,6,-$\eta$]-(methylethyl)-benzene]-iron (1+), and the like.

Examples of the anion $[MX_{n+m}]$ in general formula (4) include tetrafluoroborate ($BF_4^-$), hexafluorophosphate ($PF_6^-$), hexafluoroantimonate ($SbF_6^-$), hexafluoroarsenate ($AsF_6^-$), hexachloroantimonate ($Sb\ Cl_6^-$), and the like.

Also, an onium salt having an anion represented by the general formula $[M X_n(OH)^-]$ can be used. Further, an onium salt having another anion such as perchlorate ion ($Cl\ O_4^-$), trifluoromethanesulfonate ion ($C\ F_3SO_3-$), fluorosulfonate ion ($F\ SO_3-$), toluenesulfonate ion, trinitrobenzenesulfonate anion, trinitrotoluenesulfonate anion, and the like can be used.

Examples of the photo-acid generator preferably used in the present invention include an aromatic onium salt such as diaryliodonium salts, triarylsulfonium salts, and the like. For example, an aromatic halonium salt disclosed in Japanese Laid-Open Patent Publications S50-151996, S50-158680, and the like; an aromatic onium salt of an element of Group IV A disclosed in Japanese Laid-Open Patent Publications S50-151997, S52-30899, S56-55420, S55-125105, and the like; an aromatic onium salt of an element of Group V A disclosed in Japanese Laid-Open Patent Publications S50-158698, and the like; an oxosulfoxonium salt disclosed in Japanese Laid-Open Patent Publications S56-8428, S56-149402, S57-192429, and the like; an aromatic diazonium salt disclosed in Japanese Laid-Open Patent Publications S49-17040, and the like; a thiopyrylium salt disclosed in U.S. Pat. No. 4,139,655; and the like are preferred. Also, iron/allene complex type initiator, aluminum complex/photodegradable silicon compound type initiator, and the like can be used.

The photo-acid generators are available as commercial compounds under the trade names of ADEKA OPTOMER SP-150, SP-151, SP-170, SP-172 (manufactured by Adeka Corporation); UVI-6950, UVI-6970, UVI-6974, UVI-6990 (manufactured by Union Carbide Corporation); Irgacure 261 (manufactured by Ciba Specialty Chemicals); CI-2481, CI-2624, CI-2639, CI-2064 (manufactured by Nippon Soda CO., LTD.); CD-1010, CD-1011, CD-1012 (manufactured by Sartomer Company, Inc.); DTS-102, DTS-103, NAT-103, NDS-103, TPS-103, MDS-103, MPI-103, BBI-103 (manufactured by Midori Kagaku Co., Ltd.); PCI-061T, PCI-062T, PCI-020T, PCI-022T (manufactured by Nippon Kayaku CO., LTD.); and the like.

Of these, ADEKA OPTOMER SP-170, SP-172, UVI-6970, UVI-6974, CD-1012, MPI-103 are particularly preferred, because they can heighten the photocuring sensitivity of the resin composition.

One type of the photo-acid generator may be used alone, or two or more types of the photo-acid generators may be used in combination.

Here, a photosensitizer may be used together in order to promote the generation of the acid produced by the photo-acid generator. Examples of the photosensitizer include dihydroxybenzene, trihydroxybenzene, hydroxyacetophenone, dihydroxydiphenylmethane, and the like.

The resin composition of the present invention includes component (B) (i.e. photo-acid generator) in an amount preferably of 0.1 to 10 mass percent, more preferably of 0.1 to 5 mass percent, most preferably of 0.5 to 3 mass percent. When the amount is less than 0.1 mass percent, sufficient heat resistance sometimes cannot be obtained due to a decrease in the curing speed and the curing degree of the resin composition. When the amount exceeds 10 mass percent, there may be sometimes a problem of the deterioration of long-term reliability and waveguide loss.

[Component (C)]

Component (C) is a polymerizable monomer other than component (A). Examples of component (C) include an epoxy monomer, a monomer having a (meth)acryloyl group, and the like.

By using component (C) as a constituent of the resin composition, it is possible to adjust the viscosity of the resin composition before cured and adjust the refractive index of the resin composition after cured, as well as increase the curing speed and the like. The resin composition can have an intended viscosity, refractive index, and curing speed without using component (C) in case that the type of component (A) is selected appropriately.

Examples of component (C) include an epoxy compound such as butyl glycidyl ether, ethylene glycol diglycidyl ether, propylene glycol diglycidyl ether, neopentyl glycol diglycidyl ether, trimethylol triglycidyl ether, diglycidyl ether of propylene oxide adduct of bisphenol A, bisphenol A diglycidyl ether, and the like; a cyclohexene oxide compound such as 3,4-epoxycyclohexenylmethyl-3',4'-epoxycyclohexenecarboxylate, ε-caprolactone modified 3,4-epoxycyclohexylmethyl-3',4'-epoxycyclohexanecarboxylate, epoxidized 3-cyclohexene-1,2-dicarboxylic acid bis(3-cyclohexenylmethyl) modified ε-caprolactone, and the like; an oxetane compound such as phenyloxetane, xylenedioxetane, etc; and the like.

The resin composition of the present invention includes component (C) in an amount preferably of 0 to 89.9 mass percent, more preferably of 5 to 85 mass percent, most preferably of 17 to 82 mass percent.

In the present invention, it is possible to add various types of additives other than the above components, such as an antioxidant, UV absorber, light stabilizer, silane coupling agent, coating surface improver, thermal polymerization inhibitor, leveling agent, surfactant, colorant, storage stabilizer, plasticizer, lubricant, solvent, filler, aging resistor, wetting agent, mold release agent, and the like as appropriate.

The resin composition of the present invention can be manufactured by mixing the above components in the usual manner. The resin composition of the present invention prepared in the usual manner has a viscosity generally of 50 to 20,000 cps at 25 degree C., preferably of 100 to 10,000 cps at 25 degree C., more preferably of 200 to 5,000 cps at 25 degree C. When the viscosity is less than 50 cps at 25 degree C., it is difficult to obtain an intended film thickness, and furthermore, patterning properties sometimes decrease. When the viscosity exceeds 20,000 cps at 25 degree C., an unevenness or swell occurs when the resin composition is applied onto the substrate, and it becomes difficult to obtain an intended shape due to the deterioration of the patterning properties when a core portion is formed.

The cured product of the resin composition of the present invention preferably has a refractive index ($n_D^{25}$) of 1.55 or more. Here, the term "refractive index ($n_D^{25}$)" means the refractive index when an emission line of Na at 589 nm is passed through at 25 degree C.

The cured product of the resin composition of the present invention has a glass-transition temperature preferably of 100 degree C. or higher, more preferably of 120 degree C. or higher. Here, the term "glass-transition temperature" means the temperature where a loss tangent shows a maximum value, which is measured using a sympathetic vibration dynamic viscoelasticity measuring apparatus with a vibrational frequency of 10 Hz.

Next, an example of an optical waveguide composed of the resin composition of the present invention will now be described. FIG. 1 is a sectional view illustrating an example of an optical waveguide manufactured by using the resin composition for forming optical waveguides of the present invention. In FIG. 1, an optical waveguide 1 is formed on a substrate 2 (i.e. support plate) such as a silicon wafer and the like, and is composed of a lower clad layer 3, a strip-shaped core portion 5 formed on a part of the lower clad layer 3, and an upper clad layer 4 formed covering the sides and the upper surface of the core portion 5. The core portion 5 is an optical transmission line, and is formed using a material having a refractive index higher than the refractive indexes of the lower clad layer 3 and the upper clad layer 4.

EXAMPLES

The present invention will now be described based on the following experimental examples.

[Preparation of Radiation-Sensitive Resin Composition]

Components were mixed in amounts shown in Table 1, and then, stirred for 1 hour with the liquid temperature being controlled in the range of from 50 to 60 degree C., thus obtaining a liquid composition. In Table 1, unit of each amount of the components is parts by mass.

[Evaluation of Radiation-Sensitive Resin Composition]

1. Curing Properties

Each of the radiation-sensitive resin compositions "J-1" to "J-7" was applied onto a silicon substrate using a spin coater, and then, was irradiated with ultraviolet light having a wavelength of 365 nm and an intensity of 30 mW/cm² using a mask aligner to be UV-cured. The case that surface tackiness was removed by 30-minute irradiation was taken as "◎". The case that surface tackiness was removed by 100-minute irradiation was taken as "○".

2. Glass-Transition Temperature

Each of the radiation-sensitive resin compositions "J-1" to "J-7" was applied onto a glass substrate to be 60 μm thick using an applicator to form a resin composition layer, and then, the composition layer was irradiated with ultraviolet light at 3.0 J/cm² using a conveyor UV irradiation device to obtain a cured film. Next, the temperature dependence of the loss tangent for the cured film was measured at a vibrational frequency of 10 Hz using a sympathetic vibration dynamic viscoelasticity measuring apparatus. The temperature where the obtained loss tangent reached a maximum was taken as the glass-transition temperature (i.e. Tg)

3. Refractive Index

Each of the radiation-sensitive resin compositions "J-1" to "J-7" was applied onto a glass substrate to be 60 μm thick using an applicator to form a resin composition layer, and then, the composition layer was irradiated with ultraviolet light at 3.0 J/cm² using a conveyor UV irradiation device to obtain a cured film. The refractive index of the cured film, which is a value obtained when an emission line of Na at 589 nm is passed through at 25 degree C., was measured using an Abbe refractive index detector.

The results are shown in Table 1.

TABLE 1

| | | Resin composition | | | | | | |
|---|---|---|---|---|---|---|---|---|
| | | J-1 | J-2 | J-3 | J-4 | J-5 | J-6 | J-7 |
| Component (A) | Epikote 152 | 100 | 60 | 70 | 30 | — | — | — |
| | Epikote 157S65 | — | — | — | — | 60 | — | — |
| Comparative component | Epikote 828 | — | — | — | — | — | 60 | — |
| | DCP-A | — | — | — | — | — | — | 60 |
| | VR77 | — | — | — | — | — | — | 30 |
| | N-vinylpyrrolidone | — | — | — | — | — | — | 10 |
| Component (B) | SP-172 | 1 | — | 1 | 1 | 1 | 1 | — |
| | SP-170 | — | 1 | — | — | — | — | — |
| Comparative component | Irgacure 369 | — | — | — | — | — | — | 3 |
| Component (C) | Butyl glycidyl ether | — | — | 10 | — | — | — | — |
| | CELLOXIDE 2021P | — | 40 | 20 | 70 | 40 | 40 | — |
| Total (parts by mass) | | 101 | 101 | 101 | 101 | 101 | 101 | 103 |
| Curing properties | | ○ | ◎ | ◎ | ◎ | ◎ | ◎ | ◎ |
| Glass-transition temperature of a cured product (Tg) | | 170 | >200 | 150 | >200 | >200 | 200 | 200 |
| Refractive index of a cured product ($n_D^{25}$) | | 1.57 | 1.55 | 1.57 | 1.54 | 1.55 | 1.55 | 1.54 |

Epikote152: phenol novolac type epoxy resin (epoxy equivalent: 172~178 manufactured by Japan Epoxy Resins Co., Ltd.)
Epikote157S65: bisphenol A novolac type epoxy resin (epoxy equivalent: 200~220 manufactured by Japan Epoxy Resins Co., Ltd.)
Epikote828: bisphenol A type epoxy resin (epoxy equivalent: 184~194 manufactured by Japan Epoxy Resins Co., Ltd.)
DCP-A: dimethyloltricyclodecane diacrylate "LIGHT-ACRYLATE DCP-A" (manufactured by Kyoeisha Chemical Co., Ltd.)
VR77: vinylester resin (bisphenol type vinylester) "Ripoxy VR-77" (manufactured by Showa Highpolymer CO., Ltd.)
SP-172: "ADEKA OPTOMER SP-172" (manufactured by Adeka Corporation)
SP-170: "ADEKA OPTOMER SP-170" (manufactured by Adeka Corporation)
Irgacure 369: photo-radical polymerization initiator (manufactured by Ciba Specialty Chemicals)
CELLOXIDE 2021P: 3,4-epoxycyclohexenylmethyl-3',4'-epoxycyclohexenecarboxylate (manufactured by Daicel Chemical Industries)

[Manufacture of Optical Waveguide]

Using the prepared radiation-sensitive resin compositions "J-1" to "J-7", the optical waveguides were manufactured as follows.

Example 1

1. Formation of Lower Clad Layer

A radiation-sensitive resin composition "ELC2500 (Clear)" (manufactured by Electro-Lite Corporation: $n_D^{25}=1.15$) was applied onto a silicon substrate using a spin coater, and then, irradiated with ultraviolet light having a wavelength of 365 nm and an intensity of 30 mW/cm² for 30 seconds to be cured, thus forming a lower clad layer having a thickness of 50 µm.

2. Formation of Core Portion

Next, the radiation-sensitive composition "J-1" was applied onto the lower clad layer using a spin coater, and then, irradiated with ultraviolet light having a wavelength of 365 nm and an intensity of 30 mW/cm² for 30 seconds, via a photo-mask having a 50 µm-width line pattern, to be radiation-cured to become a cured product having the line pattern.

By soaking the substrate having the UV-cured thin film into an acetone developer, and removing the unexposed parts of the thin film, a straight line-patterned core portion having a thickness of 50 µm and a width of 50 µm was formed.

3. Formation of Upper Clad Layer

The radiation-sensitive resin composition "ELC2500 (Clear)" was applied onto the upper surface of the lower clad layer and the core portion using a spin coater, and then, irradiated with ultraviolet light having a wavelength of 365 nm and an intensity of 30 mW/cm² for 30 seconds to be cured to form an upper clad layer having a thickness of 50 µm from the upper surface of the core portion.

Examples 2 to 5, Comparative Examples 1 and 2

An optical waveguide was manufactured by the same way as Example 1 excepting that the compositions listed in Table 2 were used as the materials for the lower clad layer, core portion, and upper clad layer.

[Evaluation of Optical Waveguide]

(1) Dimensional Accuracy

With respect to the dimensional accuracy of the core portion designed to be 50 µm high and 50 µm wide, the case that the core portion actually had a height of 50±5 µm and a width of 50±5 µm was taken as "○", and the case that the core portion did not have a height of 50±5 µm or a width of 50±5 µm was taken as "X"

(2) Waveguide Loss

Light having a wavelength of 850 nm was inputted into one end of the optical waveguide. The amount of light outgoing from the other end was then measured, and the waveguide loss per unit length was obtained using a cut-back method.

(3) Heat Resistance

A linear waveguide having a waveguide length of 20 mm was prepared, and the initial insertion loss was measured. After that, the optical waveguide was heated in an oven at 200 degree C. for 30 minutes. After that, the optical waveguide was taken out and left at room temperature for a certain period of time, and then, the insertion loss was measured again. When the value of the insertion loss after heating is compared with the value of the initial insertion loss, the case that the difference between them exceeds 1.0 dB was taken as "x", and the case that the difference between them was not more than 1.0 was taken as "○".

(4) Long-Term Reliability

By the same way as described above, the initial insertion loss was measured. After that, a series of temperature changes, in which the optical waveguide was left at a temperature of −40 degree C. for 30 minutes, and then, left at a temperature of 85 degree C. for 30 minutes, was repeated 500 times using a thermal shock test chamber. After that, the optical waveguide was taken out, and the insertion loss was measured at room temperature again. When the value of the insertion loss after the thermal shock test is compared with the value of the initial insertion loss, the case that the difference between them exceeds 1.0 dB was taken as "x", and the case that the difference between them was not more than 1.0 dB was taken as "○".

The results are shown in Table 2.

TABLE 2

|  |  | Example |  |  |  |  | Comparative Example |  |
|---|---|---|---|---|---|---|---|---|
|  |  | 1 | 2 | 3 | 4 | 5 | 1 | 2 |
| Material for optical waveguide | Lower clad layer | ELC2500 | ELC2500 | ELC2500 | ELC2500 | ELC2500 | ELC2500 | ELC2500 |
|  | Core portion | J-1 | J-2 | J-3 | J-4 | J-5 | J-6 | J-7 |
|  | Upper clad layer | ELC2500 | ELC2500 | ELC2500 | ELC2500 | ELC2500 | ELC2500 | ELC2500 |
| Characteristics of optical waveguide | Dimensional accuracy of core portion | ○ | ○ | ○ | ○ | ○ | ○ | ○ |
|  | Waveguide loss [dB/cm] | 0.1 | 0.1 | 0.1 | 0.1 | 0.1 | 0.1 | 0.35 |
|  | Heat resistance | ○ | ○ | ○ | ○ | ○ | ○ | X |
|  | Long-term reliability | ○ | ○ | ○ | ○ | ○ | X | X |

Tables 1 and 2 show that the resin compositions of the present invention (Examples 1 to 5) have refractive indexes suitable for optical waveguides, and are excellent in patterning properties (i.e. dimensional accuracy), transmission characteristics (i.e. low waveguide loss), heat resistance (i.e. maintenance of good transmission characteristics under a high temperature test), and long-term reliability (i.e. maintenance of good transmission characteristics under a heat cycle test), when used as materials for optical waveguides.

On the other hand, Comparative Example 1, in which component (A) is not included, has poor long-term reliability. Comparative Example 2 is poor in transmission characteristics (i.e. waveguide loss), heat resistance, and long-term reliability.

The invention claimed is:

1. A radiation-sensitive resin composition for forming optical waveguides, which comprises: (A) a novolac type epoxy resin represented by the following general formula (1), (2), or (3), and having an epoxy equivalent of 100 to 300 g/eq, in an amount of 15 to 80 mass percent based on the total amount of the composition, wherein

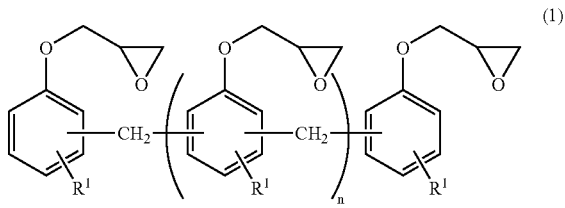
(1)

in the formula (1), $R^1$ is a hydrogen atom, an alkyl group having 1 to 12 carbon atoms, or an aralkyl group; and n is an integer from 0 to 10

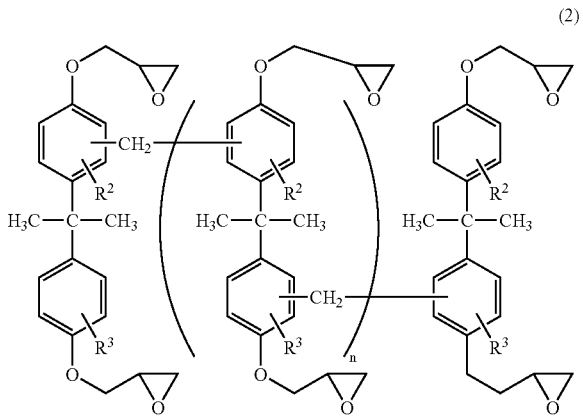
(2)

wherein, the formula (2), $R^2$ and $R^3$ are each independently a hydrogen atom, an alkyl group having 1 to 12 carbon atoms, or an aralkyl group; and n is an integer from 0 to 10

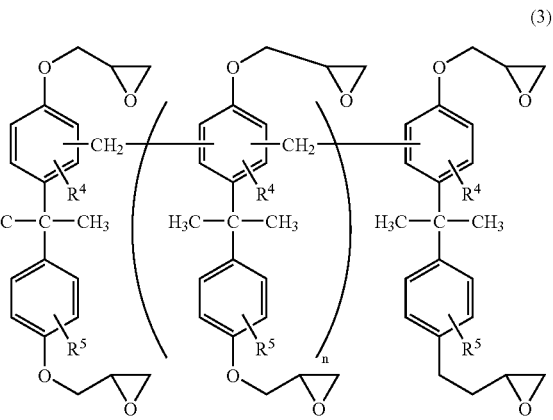
(3)

wherein, in the formula (3), $R^4$ and $R^5$ are each independently a hydrogen atom, an alkyl group having 1 to 12 carbon atoms, or an aralkyl group; and n is an integer from 0 to 10; (B) a photo-acid generator in an amount of 0.1 to 5 mass percent based on the total amount of the composition; and (C) an epoxy monomer in an amount of 17 to 82 mass percent based on the total amount of the composition.

2. The radiation-sensitive resin composition for forming optical waveguides according to claim 1, wherein a cured product of the radiation-sensitive resin composition has a refractive index ($n_D^{25}$) of 1.55 or more.

3. The radiation-sensitive resin composition for forming optical waveguides according to claim 1, wherein a cured product of the radiation-sensitive resin composition has a glass-transition temperature of 100° C. or higher.

4. An optical waveguide, which comprises a lower clad layer, a core portion, and an upper clad layer, wherein at least one selected form the lower clad layer, the core portion, and the upper clad layer is a cured product of the resin composition according to claim 1.

5. The radiation-sensitive composition for forming optical waveguides according to claim 1, wherein the component (A) is represented by the general formula (2) or (3).

6. The radiation-sensitive resin composition for forming optical waveguides according to claim 5, wherein a cured product of the radiation-sensitive resin composition has a refractive index ($n_D^{25}$) of 1.55 or more.

7. The radiation-sensitive resin composition for forming optical waveguides according to claim 5, wherein a cured product of the radiation-sensitive resin composition has a glass-transition temperature of 100° C. or higher.

8. An optical waveguide, which comprises a lower clad layer, a core portion, and an upper clad layer, wherein at least one selected from the lower clad layer, the core portion, and the upper clad layer is a cured product of the resin composition according to claim 5.

* * * * *